(12) United States Patent  
Craig

(10) Patent No.: US 8,457,645 B2  
(45) Date of Patent: Jun. 4, 2013

(54) CHANNEL ALLOCATION FOR CHANNEL ALLOCATION TIERING

(75) Inventor: Stephen G. Craig, Nacka (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1200 days.

(21) Appl. No.: 11/912,448

(22) PCT Filed: Apr. 26, 2005

(86) PCT No.: PCT/SE2005/000607  
§ 371 (c)(1),  
(2), (4) Date: Jun. 4, 2008

(87) PCT Pub. No.: WO2006/115440  
PCT Pub. Date: Nov. 2, 2006

(65) Prior Publication Data  
US 2008/0261607 A1 Oct. 23, 2008

(51) Int. Cl.  
*H04W 72/00* (2009.01)  
*H04W 36/00* (2009.01)  
*G01R 31/08* (2006.01)  
*H04B 7/212* (2006.01)

(52) U.S. Cl.  
USPC ........... 455/450; 455/436; 455/440; 455/452; 370/232; 370/347

(58) Field of Classification Search  
USPC ................... 455/450, 451, 509; 370/232, 347  
See application file for complete search history.

(56) References Cited

U.S. PATENT DOCUMENTS

| 6,542,484 B1 | 4/2003 | Ovesjö et al. | |
| 6,757,542 B2 | 6/2004 | Bruin et al. | |
| 2003/0060209 A1* | 3/2003 | Bruin et al. | 455/452 |
| 2004/0203806 A1* | 10/2004 | Craig et al. | 455/450 |

FOREIGN PATENT DOCUMENTS

| CN | 1436434 A | 8/2003 |
| JP | 2003-259428 A | 9/2003 |
| JP | 2003-259430 A | 9/2003 |
| JP | 2005-504492 A | 2/2005 |
| WO | 01/97537 A2 | 12/2001 |
| WO | WO 01/97537 A2 * | 12/2001 |
| WO | 2005/002252 A1 | 1/2005 |
| WO | 2005/006150 A2 | 1/2005 |

OTHER PUBLICATIONS

English translation of Chinese Office Action mailed May 11, 2010 in corresponding CN application 200580049617.1.

(Continued)

*Primary Examiner* — Kent Chang  
*Assistant Examiner* — Kuo Woo  
(74) *Attorney, Agent, or Firm* — Nixon & Vanderhye, P.C.

(57) ABSTRACT

A method and device for channel allocation using channel allocation tiering (CHAT), where radio resources are de-coupled from hardware resources and the available hardware resource units in a cell are divided into logical groups, "channel tiers". Each tier simultaneously utilizes, partly or fully, the same radio resources. There is a first tier and at least a second tier. In accordance with the invention terminals are allocated to the first tier until a radio resource load threshold close to but less than 100% is reached. Terminals are allocated channels on said at least second tier based upon a terminal's interference suppression capabilities, or the radio requirements of the service being used on the terminal, or the radio location of the terminal, or a combination of the above.

15 Claims, 3 Drawing Sheets

OTHER PUBLICATIONS

International Search Report dated Nov. 16, 2005.
International Preliminary Report on Patentability dated Feb. 26, 2007.
Japanese Office Action mailed Aug. 6, 2010 in corresponding application JP 2008-508785.
European Office Action mailed Dec. 6, 2010 in European application 05742500.1.
Craig et al, "Channel Allocation Tiering (CHAT): Taking GSM/EDGE Networks Beyond One-Reuse", in *Proc of VTC'01 Spring.*, 2001, pp. 2756-2760.
Ball et al, "Performance Analysis of a GERAN Switched Beam System by Simulations and Measurements", in *Proc of VTC'04 Spring*, 2004, pp. 88-92.

* cited by examiner

CHANNEL ALLOCATION FOR CHANNEL ALLOCATION TIERING

This application is the U.S. national phase of International Application No. PCT/SE2005/000607 filed 26 Apr. 2005, the entire contents of each of which are hereby incorporated by reference.

TECHNICAL FIELD

The present invention relates to a channel allocation method and a channel allocation system in a mobile cellular telecommunications system in which the channel allocation tiering (CHAT) technique is used.

In particular the invention relates to a channel allocation method based upon the interference suppression capabilities of terminals, the radio requirements of the services in use on the individual terminals, the radio location of the terminals or some combination thereof.

BACKGROUND

The use of mobile radio communications continues to grow rapidly and new data services are becoming increasingly popular. Many of these new services put greater requirements on radio quality than traditional speech services at the same time as speech traffic volumes continue to rise. Given the limited radio spectrum typically available to network operators, techniques that can increase the spectral efficiency of cellular networks are needed. Moreover, to achieve optimal performance, systems must be able to manage a range of services and terminals with varying radio requirements and interference suppression capabilities in a highly efficient manner.

An exemplary cellular network technology is GSM whose traffic loads are currently more intense than in any other type of system. With the non-uniformity of many commercial networks, extreme traffic peaks can occur in certain areas at busy hour and cells requiring close to 100% hardware load, with as many installed transceivers as there are available frequencies, already exist. Moreover, adaptive antenna products that can enable an additional doubling of spectral efficiency will soon be available [1]. Hence, the means for handling extreme loads, including the reuse of radio resources within cells, may not just be an issue for future networks using GSM or other technologies; solutions could be needed for hot spot areas in existing networks relatively soon.

Very high spectral efficiency and the means for handling extreme loads can be provided by the Channel Allocation Tiering (CHAT) technique [2]. CHAT decouples the hardware resources of a cell from the radio resources and it is possible to install a larger number of hardware resource units, e.g. transceivers, than available radio resources, e.g. frequencies, when necessary. Intra-cell co-channel interference will typically be present at peak loads in a CHAT configuration, but CHAT provides several mechanisms to manage this. Adaptive narrow-beam antennas, intra-cell interference diversity through radio resource hopping, and advanced interference suppression receivers are examples of mechanisms that may be employed.

CHAT uses fractional reuse of radio resources, that is, reuse less than one. This means that different terminals in the same cell or cell sector can use the same radio resource at the same time.

CHAT is also disclosed in [3] and may be described in the following simplified and incomplete, but illustrative manner with reference to FIG. 1 which illustrates a number of hardware resource units $1a\text{-}h$, $2a\text{-}h$, for example transceivers, a number of radio resources $3a\text{-}h$, for example frequencies, and a cell 4 in which the resources 1-3 are available.

According to the CHAT technique the available hardware resource units are split into a number of logical groups, channel tiers 5 and 6, each of a maximum size h, where h is an integer. This maximum size h equals the number of radio resources allocated to each cell. The cell can be regarded as being comprised of two logical cells 7, 8 each corresponding to a respective tier. The fractional reuse in CHAT is achieved by sharing the radio resources among different channels in different tiers. In the example shown the available hardware resource units are split into two tiers. The two tiers utilize the same radio resources $3a\text{-}h$. For example, two channels, one ($1a$) from tier 5 and one ($2a$) from tier 6, share the same radio resource $3a$ at this moment in time. In general, all tiers partially or fully share the same radio resources. However, sharing is very flexible. A channel may share its radio resources with other channels in different tiers, or it may use its allocated radio resources by itself without sharing. When two channels share the same radio resource, a collision occurs and intra-cell co-channel interference is generated. The effects of this should be minimized. In CHAT a number of techniques may be used to achieve the lowest possible collision rate and to minimize the effects of any collisions that do occur. Such techniques include different radio resource hopping sequences, e.g. frequency hopping sequences, in the two tiers, different training sequences in the two tiers together with interference suppression in the receivers, and various interference avoidance techniques such as spatial separation using adaptive antennas.

CHAT is preferably used when the number of radio resources is less than the number of hardware resource units in the cell. However, CHAT may be used in cells where the number of radio resources is more than the number of required hardware resource units.

A characteristic of the CHAT technique is that the amount the channel tiers interfere with one another is dependent on the traffic load in each tier. The allocation of traffic between the tiers will therefore affect the interference levels in the other tiers. To explain this, suppose traffic load in tier 5 is high, and low in tier 6. Since traffic load in tier 5 is high, the number of terminals in tier 5 is larger than in tier 6 where the traffic load is less. Terminals that are allocated channels in tier 6 will therefore experience more intra-cell co-channel interference (from the many terminals in tier 5) than those in tier 5 which are only affected by the few terminals in tier 6. Intra-cell co-channel interference only occurs between, not within, different tiers.

In accordance with [3] the hardware resource units in prior art CHAT systems are divided into tiers when the number of needed hardware resource units is greater than the number of radio resources in that same cell. In the following this tier configuration process is referred to as slow CHAT configuration. In accordance with [3] channel allocation to the different tiers is made with consideration to the current load in the tiers. In the following channel allocation to the different tiers is referred to as fast channel allocation. Reference [3] is silent on the means and measures to be used for the fast channel allocation.

One possible way to obtain an even spread of intra-cell interference between users in a cell or cell sector would be to divide the hardware resource units into equally sized channel tiers whenever a second (or higher) tier is introduced. However, this means that intra-cell co-channel interference will occur at far lower radio resource loads than necessary, i.e. much lower than 100%, which is clearly undesirable. Another possible way to obtain an even spread of intra-cell interference between users in a cell would be to allocate channels randomly. This, however, may have the implication that a channel in a more highly interfered channel tier is allocated to a terminal on which a service is running, that has high radio requirements in terms of the carrier-to-interference ratio (C/I), bit error rate, quality-of-service (QoS) etc., with the result that the terminal will experience excessive intra-cell co-channel interference. Another implication may be that a channel in a more highly interfered channel tier is allocated to a terminal which resides in a bad radio location, for example a terminal at the border of a cell, with the result that the terminal will experience excessive intra-cell co-channel interference. Still another implication may be that a channel in a more highly interfered channel tier is allocated to a terminal that has no or only weak interference suppression capabilities with the result that the terminal will experience excessive intra-cell co-channel interference. Intra-cell co-channel interference problems become even worse if a channel in a more highly interfered channel tier is allocated to a terminal that both has high radio requirements and a bad radio location, or is allocated to a terminal in a situation which is a combination of the listed conditions.

In [4] a radio communications system is described that utilizes multiple code sets in the downlink of a CDMA system to allow more connections in a cell. Codes are allocated to different users taking into account the interference between them.

SUMMARY

One example object of the technology disclosed herein is to provide a channel allocation method in a CHAT system that combines slow CHAT configuration and fast channel allocation in a manner that ensures that intra-cell co-channel interference is only introduced when absolutely necessary, i.e. a radio resource load threshold close to but less than 100% is reached, and, once introduced, has as minor an effect on user and system performance as possible A higher channel tier should preferably only be used when the traffic load is so high that users otherwise would be denied access to the system.

An example advantage achieved thereby is that interference levels in the network are kept to a minimum at all times, thereby maximizing user and system performance, irrespective of the prevailing traffic load in the network.

Another example object of the disclosed herein is to control fast channel allocation in a CHAT scenario systematically and in accordance with the individual requirements of a terminal. With individual requirements is meant a terminal's QoS service profile, radio location, interference suppression capabilities or combinations thereof.

An example advantage achieved with the technology disclosed herein is that only terminals that can stand higher levels of intra-cell co-channel interference will be allocated a channel in a more highly interfered channel tier Another advantage is that perceived service performance will be evenly spread out between all terminals in a cell to as large extent as possible, thereby maximizing system capacity.

DETAILED DESCRIPTION

The technology disclosed herein will primarily be described with reference to the GSM system. In a GSM system the least hardware resource is a time slot on a transceiver TRX and the least radio resource is a time slot on a frequency. In GSM there are 8 time slots in each TDMA frame, so during each TDMA frame period, transmission and reception of at most 8 logical channels, e.g. traffic channels TCHs, can be performed on a given TRX and a given frequency. In subsequent TDMA frames, communication can be carried out with the same set or a different set of 8 logical channels on the same or a different TRX using the same or a different frequency. Although the exact mapping of logical channels to hardware resources to radio resources may vary from time slot to time slot and from TDMA frame to TDMA frame, the principle of the technology disclosed herein remains the same. Hence, for the sake of clarity, the technology disclosed herein is described below as a snap shot during a single time slot in a TDMA frame. Its generalization to the dynamic case with multiple time slots in a TDMA frame and to multiple TDMA frames is straightforward.

Figure 1:
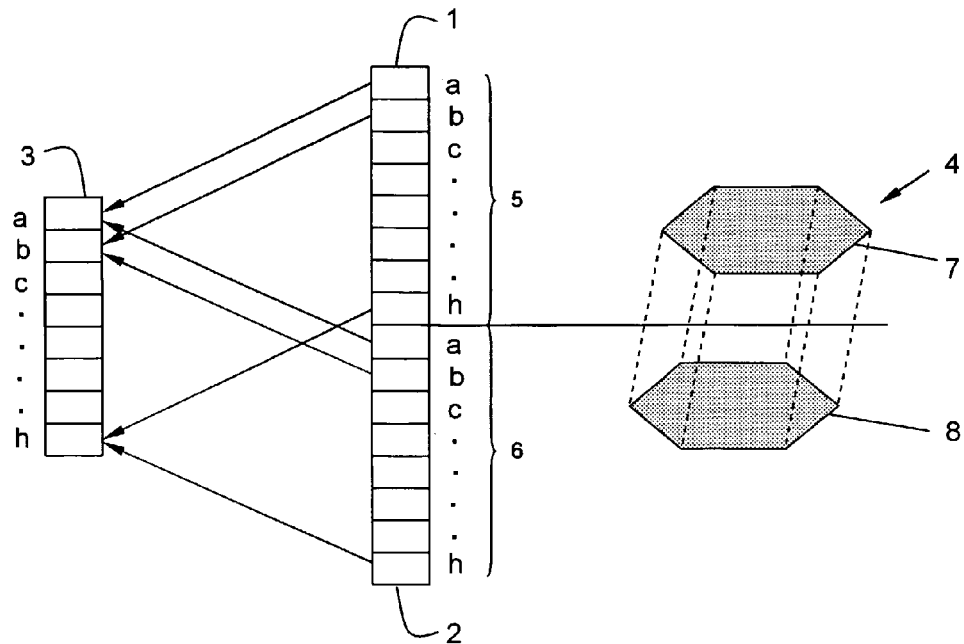
FIG. 1 is a schematic view of a CHAT system in accordance with prior art.
Figure 2:
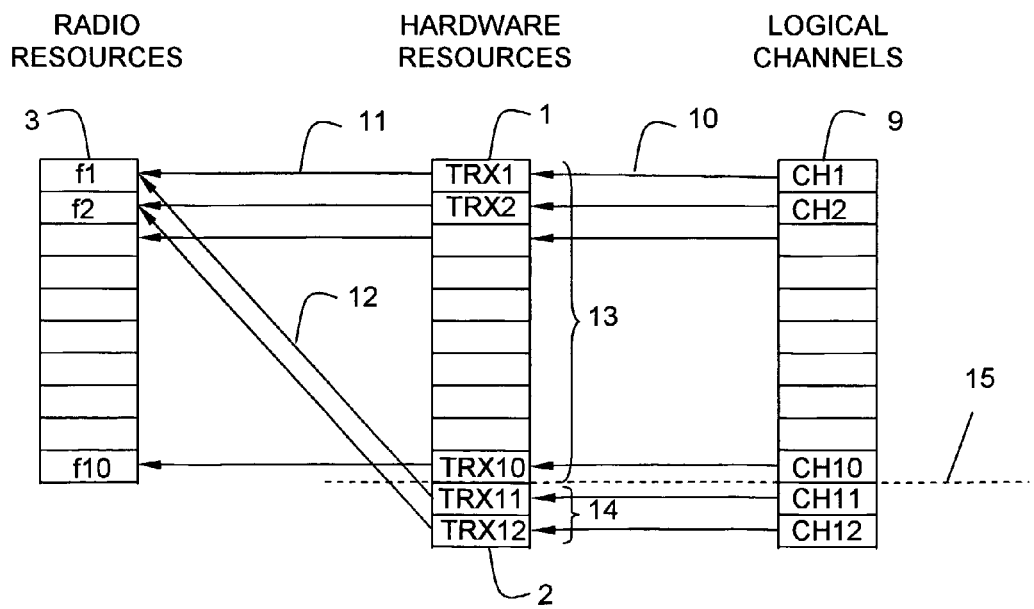
FIG. 2 is a schematic view illustrating a CHAT system in accordance with an example embodiment of the technology disclosed herein.

A first example embodiment of the technology disclosed herein will be described with reference to FIG. 2. In the drawings like elements have the same references. FIG. 2 illustrates hardware resource units 1, 2 and radio resources 3 available in a cell of a cellular mobile telecommunication system. Radio resources 3 are frequencies f1, f2, f10. Hardware resource units 1 are transceivers TRX1, TRX2, TRX10. Hardware resource units 2 are transceivers TRX11 and TRX12. Further there is a plurality of logical channels 9 each one associated with a respective hardware resource unit 1 and 2 as illustrated by arrows 10. In the illustrated example there are as many logical channels CH1, CH2, ... CH12 as there are hardware resource units 1 and 2, i.e. the hardware resources are fully utilized. Each of the hardware resource units 1 is mapped on a respective radio resource as indicated by arrows 11. There are as many hardware resource units 1 as there are radio resources, ten in the illustrated example. Channel allocation is made on the logical channels.

Each of the channels CH11 and CH12 is mapped on a respective hardware resource unit that is mapped on a respective radio resource as indicated by arrows 12. Mapping of hardware resources on radio resources is part of the slow CHAT configuration process.

To get a better understanding of the technology disclosed herein, assume a scenario wherein the cell comprises just the ten transceivers TRX1-10 and the traffic load in the cell is increasing over time. A point is reached when all time slots in all TRXes are occupied with traffic and the cell cannot take any more traffic. A state of congestion is said to exist. Since there obviously is a need to increase the capacity of the cell, two more TRXes, TRX11 and TRX 12, are added to the cell. These can use any of the frequencies f1-10 in a CHAT configuration implying a fractional reuse. The determination of the mapping between hardware resources and radio resources at this point where a CHAT configuration is introduced is a part of the slow CHAT configuration.

Traffic varies over the day and let us assume we start at a time when there is no traffic and all hardware resources are available. The first terminal to make or take a call is assigned channel CH1, which is allocated to TRX1. Since TRX1 is mapped on frequency f1 at this instant, as illustrated by arrows 11, the allocation of an individual channel to a terminal results in the assignment of an individual radio resource to the terminal. The second terminal to take or make a call is assigned a channel CH2, which is allocated to TRX2, which is mapped on f2 at this instant, as illustrated by the second of arrows 11 from the top. The second terminal will thus be allocated an individual radio resource. Channel allocation in accordance with this rather conventional manner proceeds as traffic increases. When a threshold close to, but less than, 100% of the radio resources is reached, allocation of channels in this process of fast channel allocation will take place utilizing transceivers TRX11 and TRX12.

If we for a moment consider a full TDMA frame with 8 time slots, the above-mentioned threshold may for example, be reached when all 8 time slots in TRX1-9 and two time slots in TRX 10 are occupied and only six time slots in TRX 10 are free.

Slow CHAT configuration is for example made in connection with installation of transceivers in the base transceiver station (BTS) or when traffic load is zero in the BTS. Slow CHAT configuration means that the hardware resource units 1 and 2 are divided into tiers, in this case two tiers 13 and 14, the first tier 13 comprising TRX1, TRX2, ... TRX10 and the second tier 14 transceivers TRX11, TRX12. Slow CHAT configuration also comprises establishment of the threshold. The threshold and the border between the two tiers is schematically indicated with the dashed line 15. Further, slow CHAT allocation comprises the above-mentioned assignment of radio resources to each channel tier.

The slow CHAT configuration is made in order to avoid congestion problems while still keeping interference levels in the network to a minimum at all times.

The fast channel allocation scheme allocates channels to new terminals in a strictly controlled manner and on demand. Since fractional reuse of radio resources occurs the general idea is to allocate channels in a more highly interfered channel tier to terminals that can stand more intra-cell co-channel interference while terminals that are susceptible to interference are allocated channels in a less interfered tier.

Figure 5:
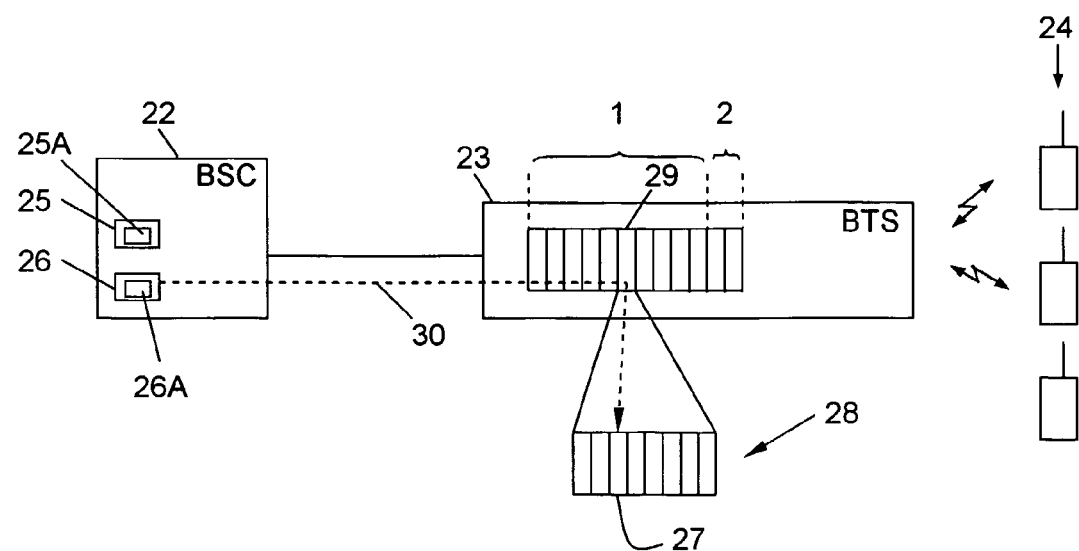
FIG. 5 is a simplified block diagram of a GSM system using the channel allocation system.

Pursuing the example above with a traffic load so high that only four of the 80 time slots during a TDMA frame period are free in the first channel tier, suppose a new terminal wants to make a call and therefore transmits a call request to its base station controller BSC (comp. FIG. 5). From the call request and from other sources the BSC is able to learn the location of the terminal, its interference suppression capabilities and its requested service. If, for example, the terminal has no interference suppression capabilities, or is in a bad radio location or its requested service requires strong radio requirements or any combination of this it will be assigned one of the free time slots in the first channel tier. If it has interference suppression capabilities or has a good radio location or its requested service has weak radio requirements or any combination of the above it is assigned to the second channel tier.

This fast channel allocation process is repeated for each new terminal that wants to make or take a call.

From the above it should be understood that fast channel allocation according to the technology disclosed herein is based on the interference suppression capabilities of the terminal in question and/or radio requirements of the given service. More robust terminals and services are preferentially allocated to the more heavily interfered tier(s). Further the fast channel allocation is based on the "radio location" of the terminal with respect to the serving base station, the cell border, surrounding interferers, etc.

It should be understood that when a hardware resource is seized, it will be marked as occupied. When a call is finished its hardware resource will be marked as free and it will be available for a new allocation.

It should also be understood that the tier to which a terminal is allocated will depend on the terminals and services that at the channel allocation moment are present in the cell. If there are no channels free on tier 13 but free channels are available on tier 14 and a call request arrives from a terminal without interference suppression capabilities that is located near the cell border, this terminal will be assigned one of the free channels on tier 14 but a reallocation of terminals will then immediately take place in accordance with the principles of the fast channel allocation scheme described above. A reallocation may result in that terminals with interference suppression capabilities that before the reallocation were assigned channels on tier 13 will be assigned channels on the more interfered tier 14, thus making the hardware resources they occupied on the less interfered tier 13 free. Of these freed hardware resources on tier 13 one will be assigned to the terminal that caused the reallocation. Possibly, and depending on e.g. a prediction of the traffic load, also other terminals with interference suppression capabilities are assigned hardware resources on the more interfered tier 14 during the reallocation. A similar reallocation of terminals will occur if conditions change during a service session, for example due to terminal mobility. The fast channel allocation scheme, adapted for a plurality of terminals, is preferably used for reallocation.

As traffic load decreases below the threshold or decreases below the threshold by a predefined amount only channels in tier 13 are utilized by the fast channel allocation scheme and channels in tier 14 will remain unoccupied until the predefined traffic load threshold is reached once again.

A terminal in a good radio location, for example in the cell centre, or running a service with weak radio requirements, i.e. a robust service that is not particularly sensitive to interference, or provided with interference suppression capabilities or having a combination of these conditions is assigned a channel in a more highly interfered channel tier, e.g. tier 14 in FIG. 2, whenever the traffic load is above the threshold level. A terminal in a bad radio location, for example at the border of a cell, or running a service with high radio requirements, or lacking interference suppression capabilities, or having any combination thereof is assigned a channel in a less interfered channel tier, e.g. tier 13 in FIG. 2, whenever possible.

Good radio locations are defined by radio or geographical distance to the serving base station, radio or geographical distance to the cell border, radio or geographical distance to surrounding interferers, carrier-to-interference ratio (C/I) or other link quality measures such as bit error rate (BER), block error rate (BLER) and frame erasure rate (FER), or some combination of the above.

Figure 3:
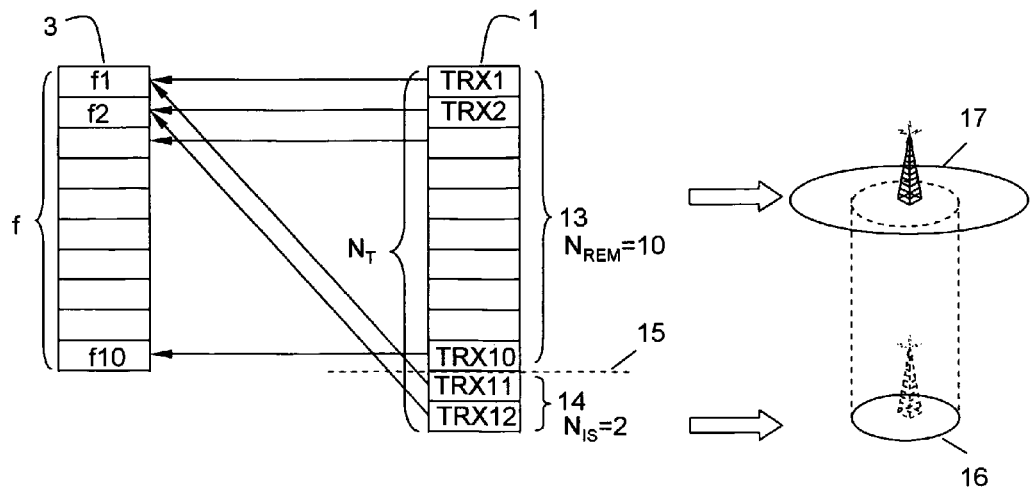
FIG. 3 is a schematic view similar to FIG. 2 illustrating an overlaid/underlaid cell configuration according to an example embodiment.

Refer to FIG. 3 that further illustrates the embodiment shown in FIG. 2. Tier 14, which is the more heavily interfered tier, is utilising an overlaid (OL) configuration 16 while tier 13 is utilising an underlaid (UL) configuration 17. Suppose there is a mix of terminals, some with interference suppression (IS) capabilities, some without.

Assume that the total number of hardware resources are located in $N_T$ hardware resource units 1, 2 that are mapped onto f radio resources, where $N_T > f$. Tier 14 is primarily for IS-capable terminals (IS is an acronym for interference suppression) and has $N_{IS}$ hardware resource units run in OL. Tier 13 is for both IS and non-IS capable terminals, and comprises $N_{REM}$ hardware resource units run in UL. At low traffic loads all terminals should be allocated channels from $N_{REM}$. At loads above the radio resource load threshold 15, IS capable terminals should be allocated channels preferentially from the $N_{IS}$ tier 14. Non-IS capable terminals should be allocated channels from the $N_{REM}$ tier 13 whenever possible.

The size of the tiers should be: $N_{IS}=N_T-f$; implying that $N_{REM}=f$.

In the illustrated GSM case there are 10 frequencies (f=10) and 12 transceivers must be installed per cell to avoid congestion, i.e. to fulfil the blocking criteria ($N_T=12$).

Then, $N_{IS}=2$ transceivers and $N_{REM}=10$ transceivers. In this case, the probability of intra-cell co-channel interference for $N_{IS}$ is at most 100% since $N_{REM}/f=1$. However, this situation is manageable since all terminals in that tier are IS-capable and in good radio locations. The probability of intra-cell co-channel interference for $N_{REM}$ is at most 20% since $N_{IS}/f=0.2$. Hence, the intra-cell co-channel interference probability for the non-IS terminals is minimised.

It should be remembered that the two tiers use frequency hopping, although with different hopping sequences. The channels in tier 13 are mapped on ten frequencies, and each individual terminal (in tier 13) jumps between some or all of these. Each individual terminal in tier 14 also hops between several or all of the ten frequencies, but at any given instant at most two of the ten frequencies are used by the tier 14 terminals. This implies that the interference experienced by a tier 13 terminal on average takes place at most two tenths (2/10) of the time, which is an interference that a non-IS capable terminal should stand.

It should be understood that a gradation of radio locations is enabled by using an overlaid/underlaid sub-cell configuration. If a terminal is residing in for example sub-cell 16, it is close to the base station and the system can use this information to optimise communication to this terminal.

Figure 4:
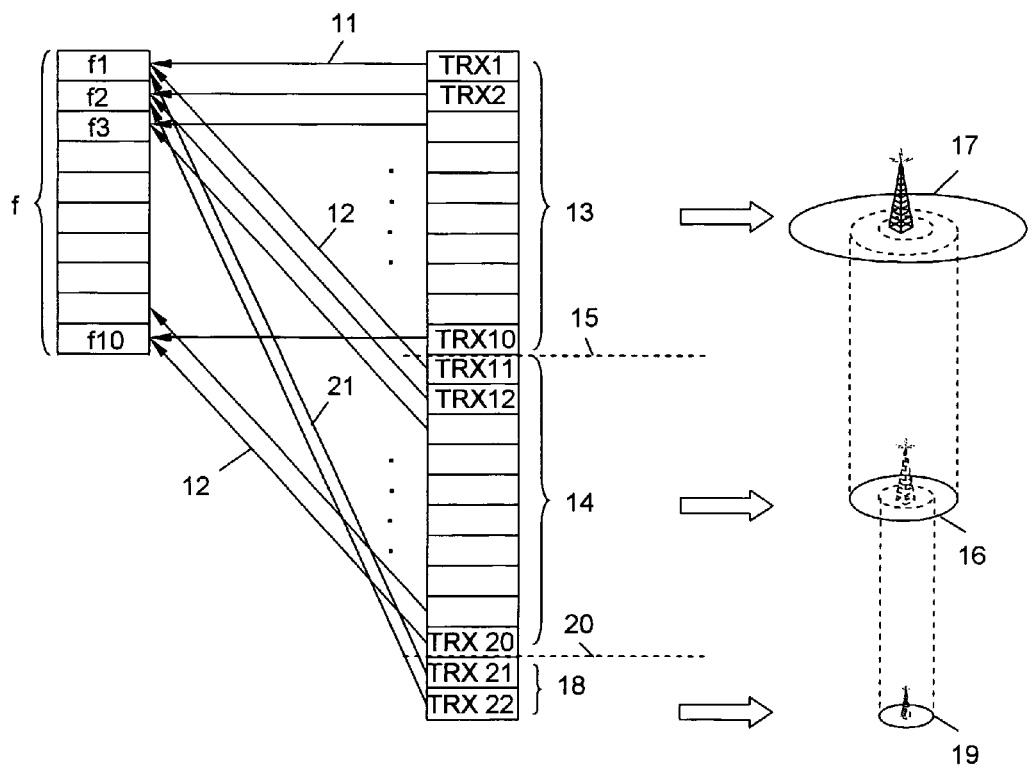
FIG. 4 is a schematic view of a CHAT system in accordance with an example embodiment of the technology disclosed herein, the system using three tiers.

Refer to FIG. 4, which may be seen as a later version of the cell described in connection with FIG. 2 or 3. Pursuing the discussed example, assume traffic in the cell continues to rise over a long time, thus calling for insertion of additional hardware resources at the cell site. Over time ten additional transceivers TRX13-22 have been inserted. Still there are only ten frequencies available. Following the same principles outlined above the slow CHAT configuration is made, now with TRX1-10 in tier 13, TRX 11-20 in tier 14 and TRX21-22 in a third tier 18 as an additional OL sub-cell 19 in the cell. Channels in tier 13 are mapped on frequencies f1-f10 as illustrated by arrows 11. Channels in tier 14 are also mapped on frequencies f1-f10 as illustrated by arrows 12, and channels on tier 18 are also mapped on frequencies f1-f10 as illustrated by arrows 21. The threshold 15 is the same and a new threshold 20 is set for the second tier 14, this threshold being so selected that it is close to but smaller than 100% of the maximum possible traffic load in tier 14, i.e. close to but smaller than 200% radio resource load in the cell. Fast channel allocation in accordance with the principles of the technology disclosed herein takes place in both tiers 14 and 18. The channels of tier 13 are allocated first, then the channels of tier 14 and finally the channels of tier 18. Reallocation between tiers in a fashion similar to what has been described in connection with FIG. 2 is used in FIG. 3.

Generally, the more heavily interfered tier or tiers are run in OL.

Following the principles above it is possible to add more hardware resources and perform slow CHAT configurations using several tiers. If there are f radio resources, T tiers and a total of $N_T$ hardware resource units, the number of hardware resource units in the final tier is equal to $N_T-(T-1)f$.

Allocating Channels to Tiers

The fast channel allocation algorithm may allocate terminals to tiers in many different ways, some of which will be outlined below.

1. As already mentioned all terminals are allocated to the first tier 13 until a radio resource load close to but less than 100% is reached.
2. Above the threshold terminals in good radio locations are allocated to the next tier 14.
3. A gradation of radio locations is enabled by using an overlaid (OL)/underlaid (UL) sub-cell configuration and each tier can be allocated to one or more radio sub-cells 16, 17, 19.
4. The steps 1-3 are repeated for higher tiers 14, 18 where the radio resource load threshold for tier N is then close to but less than N×100%.
5. To keep terminals in good radio locations in higher tiers 14, 18, a re-allocation between tiers is performed if radio locations change sufficiently during a service session as a result of terminal mobility or for other reasons, or if tier congestion at call setup or handover resulted in initial allocation to a less suitable tier.
6. The steps 1-5 are repeated but services with weaker radio requirements are allocated to higher tiers 14, 18 instead of, or together with, terminals in good radio locations.
7. The steps 1-5 are repeated but terminals with interference suppression capabilities are allocated to higher tiers 14, 18 instead of, or together with terminals in good radio locations and/or services with weaker radio requirements.
8. The same as in step 7, but where terminals with strong interference suppression characteristics are preferentially allocated to higher tiers than those with weaker interference capabilities, which are preferentially allocated to lower tiers.
9. As an alternative to step 1 above, terminals are allocated directly to the worst tier they can cope with given the service profile of the service being used. However, in most cases this would be unnecessarily conservative.

These same principles discussed above, with or without OL/UL, can be easily applied to different services, both circuit-switched and packet-switched, and to a mixture of both different types of terminals (with respect to interference suppression capabilities) and services.

System Architecture

In FIG. 5 there is shown a GSM system with a BSC (base station controller) 22 controlling a plurality of BTSs (base transceiver stations) 23 each one serving a plurality of terminals 24. A terminal in one BTS can communicate with a terminal in another via the BSC. For clarity reasons only one BTS is shown in FIG. 5. The BSC comprises conventional hard- and software and is according to the technology disclosed herein provided with a controller 25 for dividing the number of available hardware resource units into tiers. The controller comprises an algorithm 25A for slow CHAT configuration of the BTS. The BSC further comprises a controller 26 containing an algorithm 26A for fast channel allocation. A terminal is assigned a radio resource, for example one or more time slots 27 in a TDMA frame 28 on a frequency generated by a particular TRX 29. Information on the assigned radio resource is transmitted to the BTS as indicated by the dashed line 30. In the case of frequency hopping, the frequency to be utilized by the terminal changes from one TDMA frame to the next. A mobile allocation index offset (MAIO) management method may be used to distribute hopping sequences among the different terminals within a tier. This will remove any co-channel interference within each tier. The parameters such as MAIO that determine the frequency hopping sequence are a part of the radio resource assignment information sent from the BSC to the BTS (30).

When a terminal wants to make or take a call it will be assigned one or more time slots 27 in an individual transceiver 29 among the transceivers 1 or 2 by the fast channel allocation algorithm 26A. A TDMA frame and its time slots are shown at an enlarged scale at the bottom part of FIG. 5.

ADVANTAGES

The occurrence of intra-cell co-channel interference with CHAT is minimised. When intra-cell co-channel interference does occur, it affects those that are best able to cope with it, i.e. those services with weaker radio requirements and those terminals with interference suppression capabilities and/or in good radio locations. In this way the potential adverse effects caused by the intra-cell co-channel interference, e.g. near-far effects on the uplink, can be minimised and user and system performance are enhanced.

The technology disclosed herein also allows CHAT to easily be deployed in "migration scenarios" where only a fraction of the terminals have interference suppression capabilities, for example. The negative influence from intra-cell co-channel interference on non-interference suppression capable terminals is minimized.

Although the technology disclosed herein has been described with reference to a GSM system it should be understood that it is a straightforward matter for the person skilled in the art to adapt the technology disclosed herein to other cellular mobile telephone systems, for example those based on OFDM and CDMA. Since the radio resources in OFDM systems are divided into frequencies and time slots in a similar way to GSM, and hardware resource units like transceivers are also required, the principles of the technology disclosed herein that have been outlined above with reference to GSM can be directly applied to OFDM systems as well. Furthermore, DS (direct sequence) CDMA systems like WCDMA have spreading codes as radio resources and channel elements as hardware resources and they can also make use of the technology disclosed herein. Higher channel tiers will then be allocated new scrambling codes, rather than frequency hopping sequences as in GSM.

The logical channels 9 shown in FIG. 2 and the accompanying text are abstract and do not have a physical existence. They have been used in order to facilitate the understanding of the term channel. A channel is physically embodied by a hardware resource, such as a transceiver. A channel may also be physically embodied by a radio resource, such as a frequency.

REFERENCES

[1] Carsten Ball et al., "Performance Analysis of a GERAN Switched Beam System by Simulations and Measurements", in *Proc of VTC '04 Spring*.
[2] Stephen Craig et al., "Channel Allocation Tiering (CHAT): Taking GSM/EDGE Networks Beyond One-Reuse", in *Proc of VTC '01 Spring*.
[3] WO-A2-0197537
[4] U.S. Pat. No. 6,542,484

The invention claimed is:

1. A method of allocating channels to terminals within a cell of a cellular mobile telecommunication system, the method comprising:

using a channel allocation tiering (CHAT) technique in accordance with which a number ($N_T$) of available hardware resource units exceeds a number (f) of radio resources, and the number of available hardware resource units are divided into at least two tiers, a first tier and at least a second higher tier, hardware resource units of said at least second higher tier sharing radio resources with any one of the hardware resource units of the first tier, some of the terminals being capable of interference suppression, allocating channels in said tiers to an individual terminal based upon said terminal's ability to operate in a higher interfered channel, said ability determined by one or more of:
  interference suppression capabilities of the individual terminal,
  radio requirements of a service used by the individual terminal or radio location of the individual terminal;

mapping a set of hardware resource units in the first tier on a set of radio resources such that there are as many hardware resource units as there are radio resources (f); and wherein:
  a number of hardware resource units in each of said higher tiers except a T-th tier is f,
  a number of hardware resource units in the T-th tier is $N_T-(T-1)f$,
  $N_T$ is a total number of hardware resource units, and
  T is a number of tiers and f is the number of radio resources.

2. The method of claim 1, further comprising allocating channels in the first tier to terminals until a radio resource load threshold close to, but less than, 100% is reached.

3. The method of claim 2, further comprising allocating terminals in good radio locations to channels on said second tier when a radio resource load is above the threshold.

4. The method of claim 3, further comprising allocating to each tier one or more sub-cells in an overlaid/underlaid sub-cell configuration.

5. The method of claim 1, further comprising:
  (a) allocating channels in the first tier to terminals until a radio resource load threshold close to, but less than, 100% is reached;
  (b) allocating terminals in good radio locations to channels on said second tier when a radio resource load is above the threshold;
  (c) allocating to each tier one or more sub-cells in an overlaid/underlaid sub-cell configuration; and
  (d) repeating (a)-(c) for said at least second tier, where the radio resource load threshold for a tier (N) is then close to but less than N×100%.

6. The method of claim 1, further comprising re-allocating terminals between tiers if radio conditions change as a result of terminal mobility or for other reasons so as to keep terminals in good radio locations in higher tiers.

7. The method of claim 1, further comprising re-allocating terminals between tiers when radio resource load changes from below a threshold to above the threshold.

8. The method of claim 7, further comprising performing the re-allocation in connection with a call set-up or in connection with a handover.

9. The method of claim 1, further comprising repeating the steps of claim 1 but allocating terminals using services with weaker radio requirements to said at least second higher tier instead of or together with terminals in good radio locations.

10. The method of claim 1, wherein good radio locations are defined by (a) radio or geographical distance to a serving base station, (b) radio or geographical distance to a cell border, (c) radio or geographical distance to surrounding interferers, (d) carrier-to-interference ratio (C/I), (e) bit error rate (BER), (f) block error rate (BLER), (g) frame erasure rate (FER), or (h) a combination of one or more of (a)-(g).

11. The method of claim 1, further comprising repeating steps of claim 1 but allocating terminals having interference suppression capabilities to higher tiers instead of or together with terminals in good radio locations and/or services with weaker radio requirements.

12. The method of claim 11, further comprising allocating terminals with stronger interference suppression capabilities to a higher tier than terminals with weaker interference suppression capabilities.

13. The method of claim 1, further comprising allocating terminals directly to a worst loaded tier they can cope with given their quality-of-service requirements, assuming all remaining tiers are heavily loaded.

14. A system for allocating channels to terminals within a cell of a cellular mobile telecommunication system, some terminals being capable of interference suppression, the allocation system using a channel allocation tiering (CHAT) technique in accordance with which a number ($N_T$) of available hardware resource units exceeds a number (f) of radio resources;

the allocation system comprising:

a controller adapted to divide the number of available hardware resource units into at least two tiers, a first tier and at least a second higher tier;

an algorithm for mapping the tiers onto a plurality of radio resources such that hardware resource units of said at least second higher tier share radio resources with any one of the hardware resource units of the first tier;

an algorithm for allocating channels in said tiers to an individual terminal based upon said terminal's ability to operate in a higher interfered channel, said ability determined by one or more of:

interference suppression capabilities of the individual terminal, radio requirements of the service used by the individual terminal or radio location of the individual terminal, wherein the controller is adapted to set a threshold relating to radio resource utilization of a respective tier, said threshold being close to but less than 100%; and wherein:

a number of hardware resource units in each of said higher tiers except a T-th tier is f, a number of hardware resource units in the T-th tier is $N_T-(T-1)f$, $N_T$ is a total number of hardware resource units, and T is a number of tiers and f is the number of radio resources.

15. A system for allocating channels to terminals within a cell of a cellular mobile telecommunication system, some terminals being capable of interference suppression, the allocation system using a channel allocation tiering (CHAT) technique in accordance with which a number ($N_T$) of available hardware resource units exceeds a number (f) of radio resources, the allocation system comprising:

a controller configured to:

divide the number of available hardware resource units into at least two tiers, a first tier and at least a second higher tier;

map the tiers onto a plurality of radio resources such that hardware resource units of said at least second higher tier share radio resources with any one of hardware resource units of the first tier;

allocate channels in said tiers to an individual terminal based upon said terminal's ability to operate in a higher interfered channel, said ability determined by one or more of:

interference suppression capabilities of the individual terminal, radio requirements of the service used by the individual terminal or radio location of the individual terminal, set a threshold relating to radio resource utilization of a respective tier, said threshold being close to but less than 100%; and wherein:

a number of hardware resource units in each of said higher tiers except a T-th tier is f, a number of hardware resource units in the T-th tier is $N_T-(T-1)f$, $N_T$ is a total number of hardware resource units, and T is a number of tiers and f is the number of radio resources.

* * * * *

UNITED STATES PATENT AND TRADEMARK OFFICE
CERTIFICATE OF CORRECTION

PATENT NO. : 8,457,645 B2  
APPLICATION NO. : 11/912448  
DATED : June 4, 2013  
INVENTOR(S) : Craig It is certified that error appears in the above-identified patent and that said Letters Patent is hereby corrected as shown below:

In the Specification

In Column 3, Line 47, delete "disclosed" and insert -- technology disclosed --, therefor.

In Column 4, Line 37, delete "f2, f10." and insert -- f2, … f10. --, therefor.

In Column 4, Line 38, delete "TRX2, TRX10." and insert -- TRX2, … TRX10. --, therefor.

In Column 5, Line 19, delete "may" and insert -- may, --, therefor.

In Column 8, Line 6, delete "below." and insert -- below: --, therefor.

Signed and Sealed this  
Eighteenth Day of February, 2014

Michelle K. Lee  
*Deputy Director of the United States Patent and Trademark Office*